(12) United States Patent
Soncini et al.

(10) Patent No.: US 9,901,103 B1
(45) Date of Patent: Feb. 27, 2018

(54) AUTOMATIC MACHINE FOR REMOVING THE BACON HANGING HOOK

(71) Applicants: TECSAL S.P.A., Medesano (PR) (IT); TECAU S.R.L., Rubiera (RE) (IT)

(72) Inventors: Stefano Soncini, Medesano (IT); Valentina Lanzafame, Rubiera (IT)

(73) Assignees: TECSAL S.P.A., Medesano (PR) (IT); TECAU S.R.L., Rubiera (RE) (IT)

(*) Notice: Subject to any disclaimer, the term of this patent is extended or adjusted under 35 U.S.C. 154(b) by 0 days.

(21) Appl. No.: 15/348,128

(22) Filed: Nov. 10, 2016

(51) Int. Cl.
*A22C 17/00* (2006.01)
*A22C 15/00* (2006.01)

(52) U.S. Cl.
CPC ........ *A22C 17/0093* (2013.01); *A22C 15/005* (2013.01)

(58) Field of Classification Search
CPC ... A22C 17/00; A22C 17/0006; A22C 17/002; A22C 17/0033

USPC .......................................... 452/177, 179–181
See application file for complete search history.

(56) References Cited

U.S. PATENT DOCUMENTS

| | | | | |
|---|---|---|---|---|
| 4,246,837 A | * | 1/1981 | Chenery | A22C 17/008 452/134 |
| 5,407,384 A | * | 4/1995 | Boody | A22B 5/0005 452/134 |
| 6,244,425 B1 | * | 6/2001 | Volker | B65G 17/20 198/686 |
| 6,882,434 B1 | * | 4/2005 | Sandberg | A22C 17/0033 250/223 R |
| 8,517,806 B2 | * | 8/2013 | Fillenworth | A22C 7/00 452/179 |
| 8,540,556 B2 | * | 9/2013 | Hiddink | A22C 21/003 452/179 |

* cited by examiner

*Primary Examiner* — Richard T Price, Jr.
(74) *Attorney, Agent, or Firm* — Young & Thompson

(57) ABSTRACT

An automatic machine that through a hook detachment group comprising at least one rotating eccentric positioned between two conveyor belts allows the removal of hooks from bacon slabs.

6 Claims, 5 Drawing Sheets

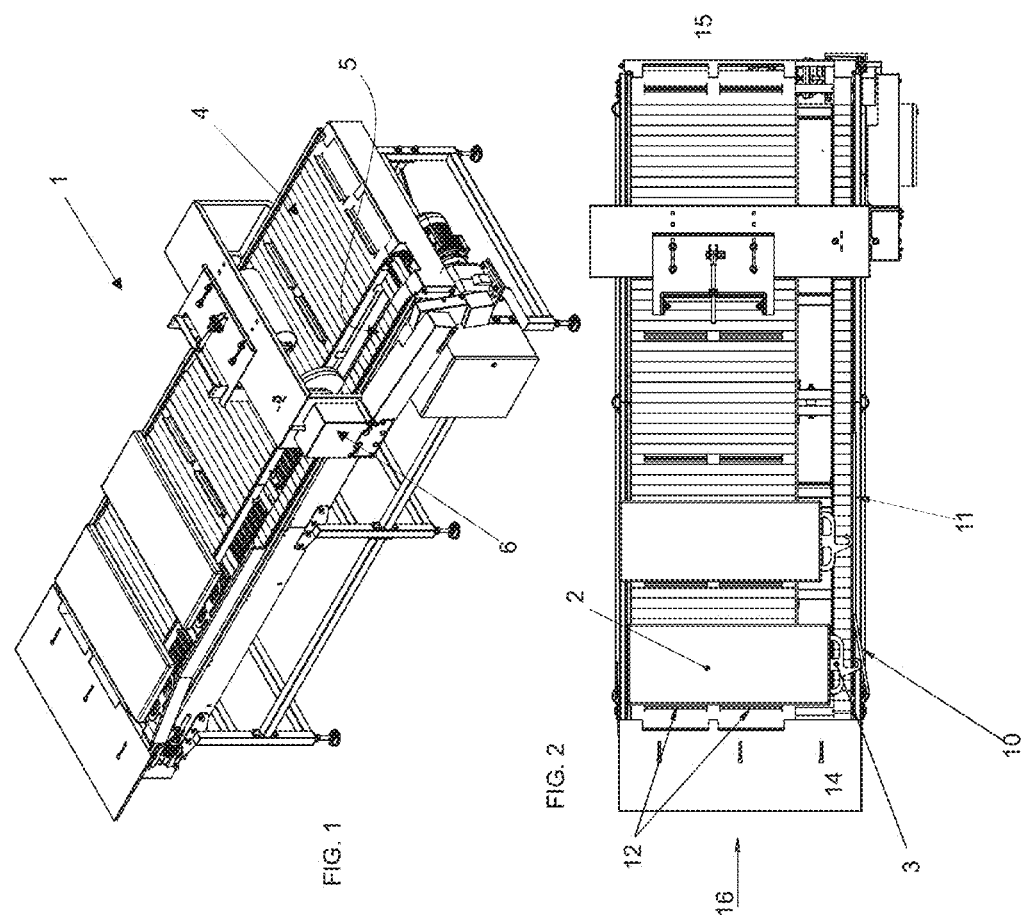

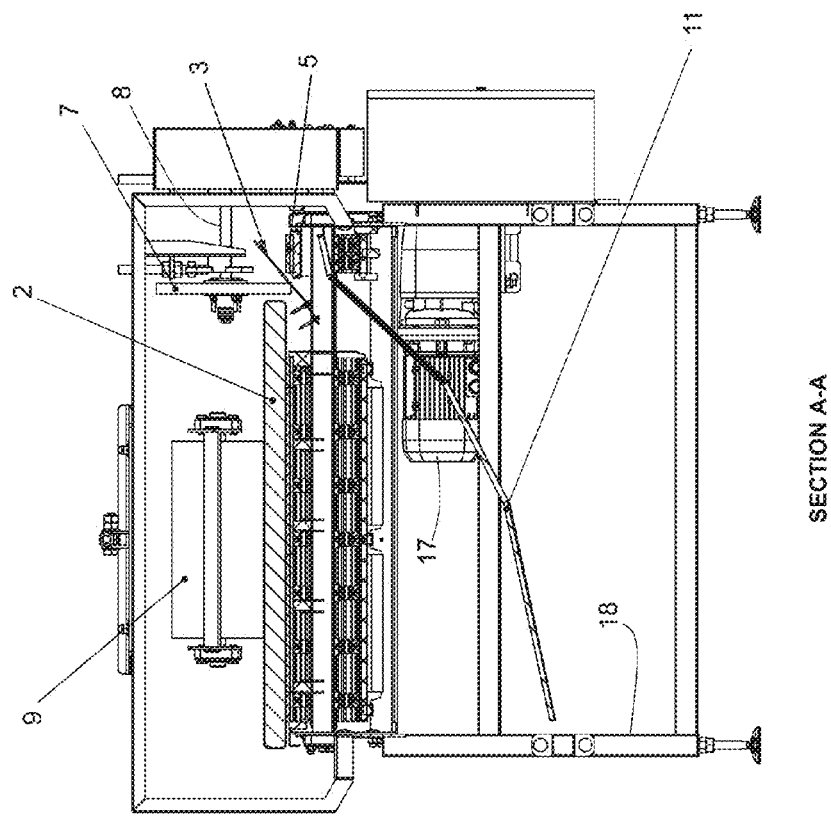

AUTOMATIC MACHINE FOR REMOVING THE BACON HANGING HOOK

SCOPE OF THE INVENTION

The present invention relates to the field of industrialized meat handling, and more specifically it relates to an automatic machine configured to remove the metal structure normally used to hang meats during the processing and/or seasoning thereof.

In particular, the machine is used for removing hooks from bacon pieces or slabs. Generally, the meat cuts for bacon are processed and handled by suspension, on special hooks, for a predetermined time and in a suitable processing area.

PRIOR ART

Currently, the bacon hanging hook is removed by the operators who intercept the bacon provided with the hook facing upward on the production line conveyor belt. Once the hook has been grasped with one hand and the bacon with the other hand to make a contrast, they pull the hook upwards, thereby releasing it from the bacon.

It is noted that bacon hanging hooks are fitted on the lean side, opposite to the rind on one of the short sides of the product.

DESCRIPTION AND ADVANTAGES OF THE INVENTION

One object of the present invention is to provide an automatic equipment for removing the hooks with a simple, rational and rather cost-effective solution.

These and other objects are achieved with the features of the invention described in the independent claim 1. The dependent claims describe preferred and/or particularly advantageous aspects of the invention.

In particular, an embodiment of the present invention provides an automatic machine for removing the bacon hanging hook comprising two conveyor belts, one for meat and one for the hook, a hook detachment group comprising at least one eccentric rotating between the belts and a pressure roller adapted to keep the meat in the predetermined position during the hook detachment step.

With this solution, the bacon hanging hook is removed in an efficient and automated manner.

Said objects and advantages are all achieved by the machine object of the present invention, which is characterized by the following claims.

BRIEF DESCRIPTION OF THE FIGURES

This and other features will become more apparent from the following description of some of the configurations, illustrated purely by way of example in the accompanying drawings.

FIG. 1: shows a perspective view of the subject machine,
FIG. 2: shows a perspective top view of the subject machine,
FIG. 3: shows an elevation transverse view according to a section of the machine in the hook detachment area.

DESCRIPTION OF THE INVENTION

Figure 4:
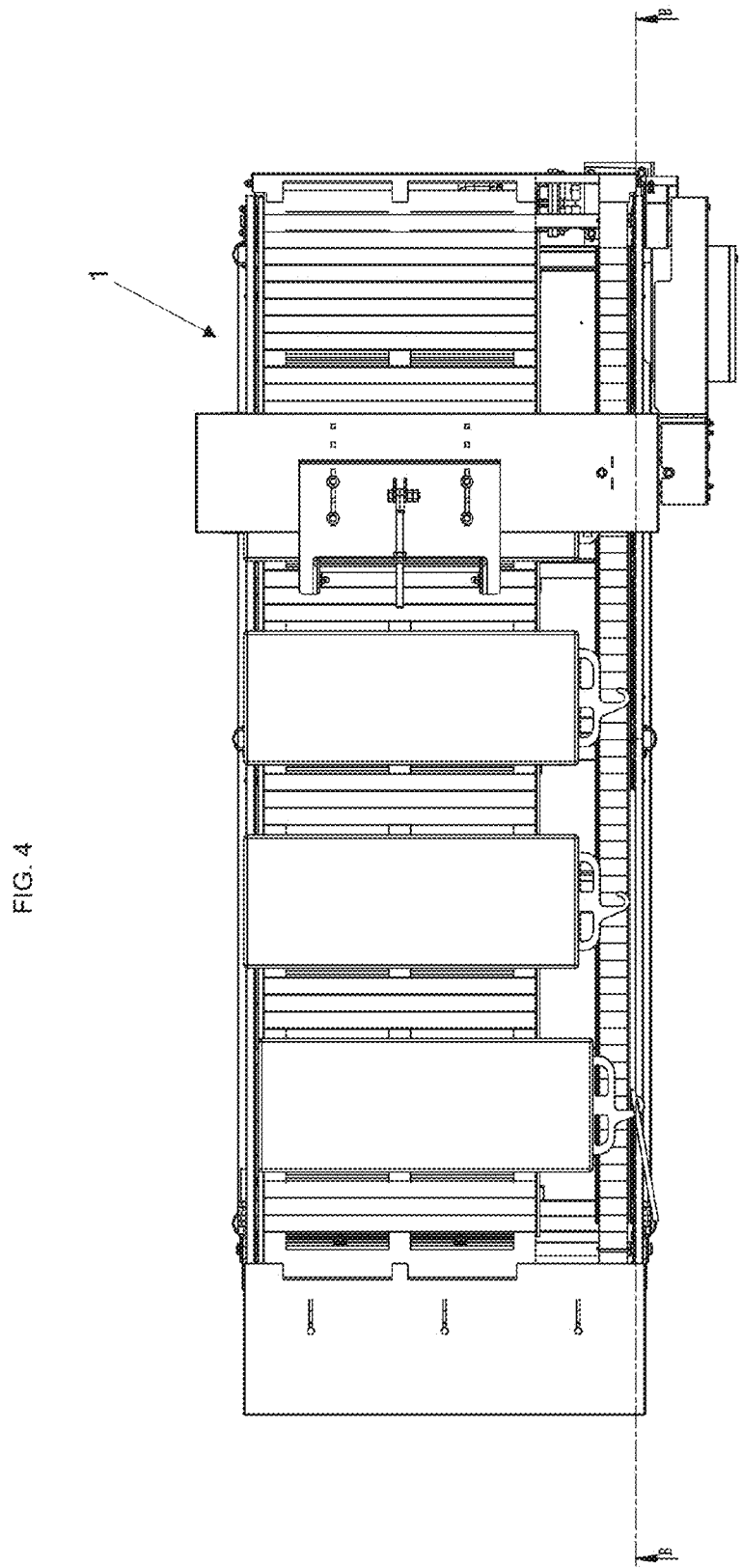
FIG. 4: shows another top view.
Figure 5:
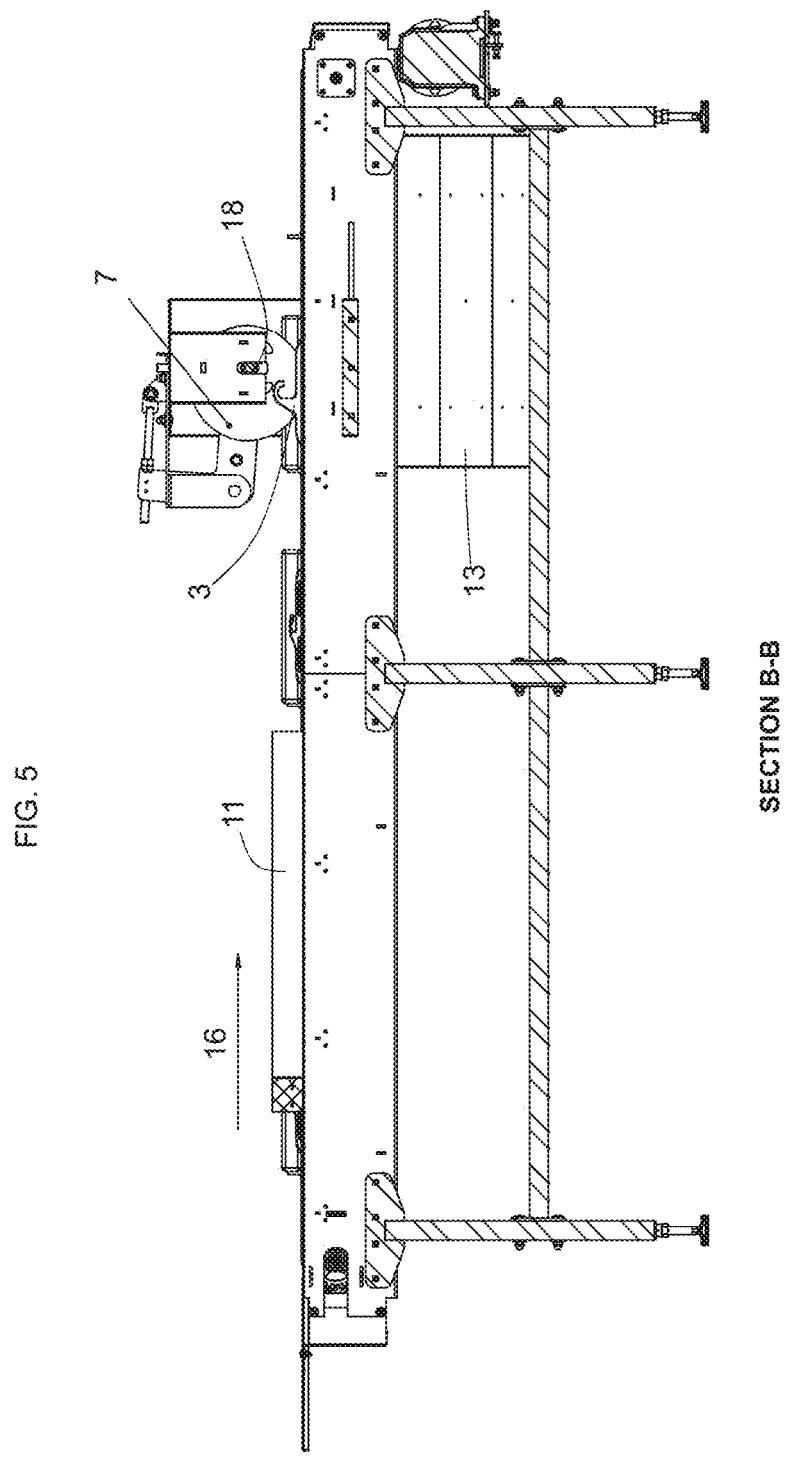
FIG. 5: shows a lateral elevation sectional view.
Figure 6:
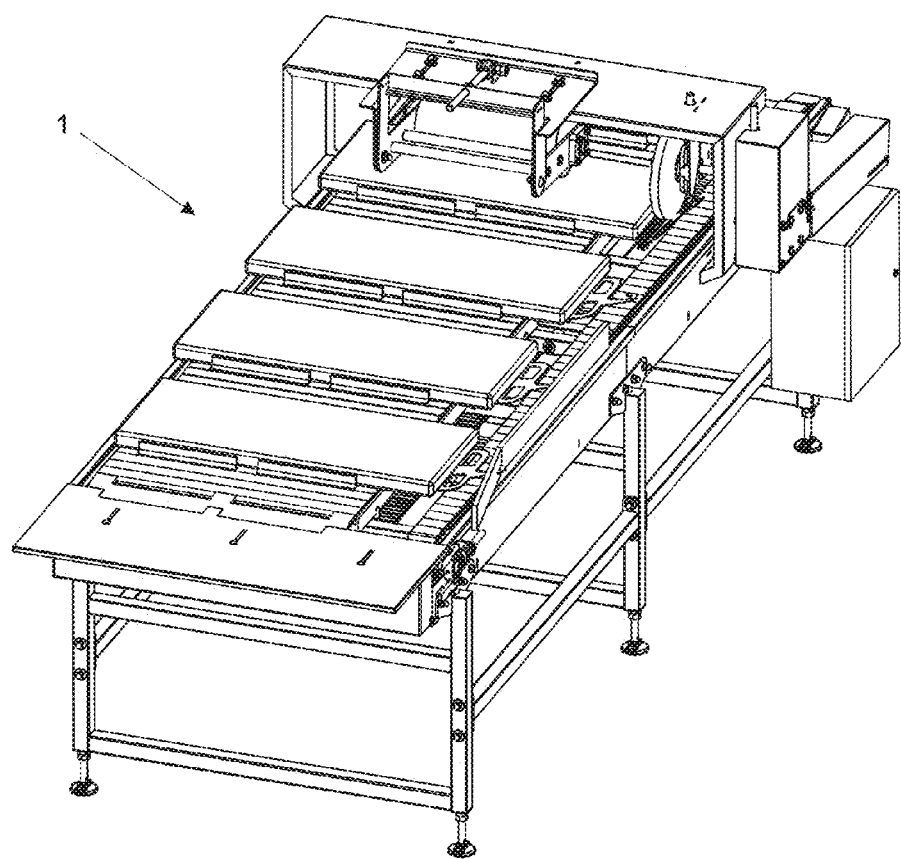
FIG. 6: shows a perspective view from a different angle.

With particular reference to the figures, reference numeral 1 indicates a machine for removing hooks from bacon slabs. Machine 1 comprises at least:
- a bearing structure 18 mounted on leveling feet, the latter preferably adjustable,
- A first conveyor belt, 4, provided with abutment elements known as flights 12, which extend from the belt itself and are placed at regular intervals; said first belt is adapted to support the meat, i.e. bacon 2,
- A second conveyor belt 5, distanced from and parallel to the previous one, adapted to support at least the curved portion of hook 3 fitted into meat 2 supported by the first belt 4,
- A hook detachment group 6, comprising at least one rotating eccentric 7,
- A pressure roller 9 adapted to keep the meat in the predetermined position during the hook detachment step.

According to the invention, a motor unit 17 is also provided, consisting of at least one electric motor, a gear motor, a series of pinion chain for motion transmission to said first and second belt and a pair of toothed module gears to reverse the motion.

An electrical panel provided with controls is also provided for operating and regulating the machine drive.

Operational Steps

Bacon 2 with the respective hook 3 is placed horizontally, the latter facing towards the second belt, i.e. downwards.

In this configuration, the rind is facing upwards.

The bacon lies on the first conveyor belt 4 and precisely it must be placed so that the long edge of the bacon slab (that facing the load) is in contact with the abutment or flight 12 of the conveyor belt 4. Looking at the machine from the product inlet side 14, the short side of bacon, i.e. that including hook 3, is positioned rightwards.

In addition, the product must be kept rightwards up to make the curved portion of hook 3 coincide with a tilted lateral positioning guide 10.

At this point, by advancing the conveyor belt, the tilted lateral positioning guide slides the bacon with respect to the conveyor belt in a direction opposite to the lateral guide; in other words, looking at the machine from the side of the load, the bacon thus translates to the left and it translates by the entire length of the inclined lateral positioning guide.

When the hook slides against the next lateral positioning guide 11 linear and parallel to the belts, the bacon stops translating transversally with respect to the conveyor belt. This is the correct position of the bacon with respect to the conveyor belt and to the parallel hook support conveyor belt to carry out the detachment of the hook.

The bacon thus positioned advances towards the detachment group 6 which, as said, bears at least one beater eccentric 7.

The beater eccentric 7 is set in rotation by means of shaft 8 and motor means. The axis of rotation of shaft 8 is horizontal; shaft 8 is also placed transversally with respect to the advancement of the two hook and meat support belts.

As a result of the eccentricity with respect to the axis of rotation, during the rotation the beater eccentric 7 carries out an alternating high-low movement, more precisely it moves downwards so that it can reach a level lower than that of hook 3 resting on the conveyor belt 5.

The beater eccentric is substantially disc-shaped and being perpendicular to the rotating shaft, it is parallel between the two belts.

With this configuration, the detachment of the hook from the meat takes place since the beater eccentric, while descending to a lower level than the belt, pushes the hook downwards.

It is noted that in line with the axis of the detachment group there is also a pressure roller 9 adapted to keep the meat in the predetermined position during said hook detachment step.

In conclusion, if on the hook side the hook cannot descend as it is resting on the hook support belt, it follows that on the side opposite to the hook, the release can take place; the hook detaches its tips from the bacon and is released from them. The hook is then collected by a lower plate 13 of structure 18, placed at the detachment area.

The detachment takes place if the beater eccentric moves in phase with the two conveyor belts; to this end, the flights of the product conveyor belt are placed at a distance that takes into account when the beater eccentric carries out its descent below the level of the conveyor belts, so the bacon must be in that position.

INDEX OF REFERENCES USED IN THE DRAWINGS

1 Machine assembly
2 Bacon
3 Hook
4 First belt
5 Second belt
6 Detachment group
7 Eccentric
8 Eccentric rotation shaft
9 Pressure roller
10 Tilted guide
11 Straight guide
12 Flights
13 Collection plate
14 Product loading side
15 Product unloading side
16 Belt feeding
17 Motor
18 Structure

The invention claimed is:

1. Automatic machine for removing a hook from a slab of bacon; the machine comprising:
   a. a bearing structure mounted on leveling feet,
   b. a first conveyor belt, provided with abutment elements known as flights, which extend from the belt itself and are placed at regular intervals; said first belt is adapted to support the meat,
   c. a second conveyor belt, distanced from and parallel to the previous one, adapted to support at least the curved portion of the hook that is fitted into the meat that is supported by the first belt, and
   d. a hook detachment group comprising at least one rotating eccentric positioned between said first and second conveyor belt.

2. The machine according to claim 1, in which
   a. during the rotation a beater eccentric carries out an alternating high-low movement, more precisely it moves downwards so that it can reach a level lower than that of the hook resting on the conveyor belt,
   b. the beater eccentric moves in phase with the two conveyor belts and carries out its descent below the level of the conveyor belts when the bacon and the hook are in the corresponding descent position.

3. The machine according to claim 1, wherein a pressure roller arranged in a detachment area is adapted to keep the meat in the predetermined position during a hook detachment step.

4. The machine according to claim 1, wherein a lateral positioning guide, arranged inclined with respect to the belts; said guide configured to slide the bacon with respect to the conveyor belt in a direction opposite to the lateral guide.

5. The machine according to claim 1, wherein at least one motor unit consisting of electric motor, gear motor and a series of pinion chain for motion transmission to said first and second belt.

6. The machine according to claim 1, wherein a pair of toothed module gears to reverse the motion.

* * * * *